(12) United States Patent
Jagannathan et al.

(10) Patent No.: US 11,231,985 B1
(45) Date of Patent: Jan. 25, 2022

(54) APPROACH TO AUTOMATED DETECTION OF DOMINANT ERRORS IN CLOUD PROVISIONS

(71) Applicant: INTERNATIONAL BUSINESS MACHINES CORPORATION, Armonk, NY (US)

(72) Inventors: Anupama Jagannathan, Cedar Park, TX (US); Karthick Rajamani, Austin, TX (US); Han Na, Pflugerville, TX (US); Amos A. Omokpo, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/935,123

(22) Filed: Jul. 21, 2020

(51) Int. Cl.
*G06F 11/07* (2006.01)
*G06N 20/00* (2019.01)

(52) U.S. Cl.
CPC ........ *G06F 11/079* (2013.01); *G06F 11/0709* (2013.01); *G06F 11/0712* (2013.01); *G06F 11/0751* (2013.01); *G06N 20/00* (2019.01)

(58) Field of Classification Search
CPC ............... G06F 11/079; G06F 11/0712; G06F 11/0766; G06F 11/0772; G06F 11/0778; G06F 11/0793; G06F 11/3006; G06F 11/301; G06F 11/3065; G06N 20/00; H04L 41/069; H04L 41/5054; H04L 41/0806; H04L 67/10; H04L 67/28; H04L 67/34
See application file for complete search history.

(56) References Cited

U.S. PATENT DOCUMENTS

| | | | |
|---|---|---|---|
| 9,652,354 B2 | 5/2017 | Vitaly et al. | |
| 2005/0081118 A1* | 4/2005 | Cheston | G06F 11/0784 714/47.1 |
| 2006/0224930 A1* | 10/2006 | Bantz | G06F 21/552 714/48 |
| 2008/0040407 A1* | 2/2008 | Ge | G06F 9/5027 |

(Continued)

OTHER PUBLICATIONS

Tak, et al., "Priolog: Mning Important Logs via Temporal Analysis and Prioritization," MDPI, Sustainability 2019, 11 6306, 17 pages.

(Continued)

*Primary Examiner* — Gabriel Chu
(74) *Attorney, Agent, or Firm* — Conley Rose, P.C.

(57) ABSTRACT

A system is configured to determine a dominant error causing a provisioning step to become stuck during provisioning of a machine in a cloud environment. The system includes memory for storing instructions, and a processor configured to execute said instructions to determine an inverse error frequency (IEF) value for pre-intervention errors in a set of intervention provisioning data; determine a dominant error for a provision during said provisioning step in said set of intervention provisioning data based on a pre-intervention error that has a maximum IEF value; determine a duration frequency (DuF) value for the provision at said provisioning step for provisions in a set of non-intervention provisioning data; and determine said dominant error for each provision during said provisioning step in said set of non-intervention provisioning data based on an error that resulted in DuF value.

20 Claims, 8 Drawing Sheets

(56) References Cited

U.S. PATENT DOCUMENTS

| | | | |
|---|---|---|---|
| 2009/0201799 A1* | 8/2009 | Lundstrom | H04L 41/06 370/217 |
| 2011/0134451 A1* | 6/2011 | St. Jacques, Jr. ... | G06F 11/0748 358/1.13 |
| 2013/0311645 A1* | 11/2013 | Nagami | G06F 11/0757 709/224 |
| 2015/0347264 A1* | 12/2015 | Mohammed | H04L 67/10 714/45 |
| 2016/0342453 A1* | 11/2016 | Khan | G06F 11/0751 |
| 2017/0249200 A1 | 8/2017 | Mustafi et al. | |
| 2018/0267859 A1* | 9/2018 | Allman | G06F 16/24568 |
| 2018/0349213 A1* | 12/2018 | Antony | G06F 11/0766 |
| 2020/0026538 A1* | 1/2020 | Cui | G06N 7/005 |
| 2020/0151023 A1* | 5/2020 | Bai | H04L 67/34 |
| 2020/0371857 A1* | 11/2020 | Guha | G06K 9/626 |

OTHER PUBLICATIONS

Du, et al., "DeepLog: Anomaly Detection and Diagnosis from System Logs through Deep Learning," CCS'17, Oct. 30-Nov. 3, 2017, Dallas, TX, USA © 2017 ACM. ISBN 978-1-4503-4946-8/17/10, 14 pages.

Moghaddam, "Anomaly-aware Management of Cloud Computing Resources," Thesis, Jul. 2019, 238 pages.

Pouchard, et al., "Prescriptive Provenance for Streaming Analysis of Workflows at Scale," Brookhaven National Laboratory, BNL-212071-2019-COPR, USDOE Office of Science (SC), Basic Energy Sciences (BES) (SC-22), Aug. 6-8, 2018, 8 pages.

Alnafessah, et al, "Artificial Neural Networks Based Techniques for Anomaly Detection in Apache Spark," Cluster Computing, https://doi.org/10.1007/s10586-019-02998-y, published Oct. 23, 2019, 16 pages.

Debnath, et al., "LogLens: A Real-time Log Analysis System," 2018 IEEE 38th International Conference on Distributed Computing Systems (ICDCS), IEEE, 2018, pp. 1052-1062.

Xu, et al., "Detecting Large-scale System Problems by Mining Console Logs," Proceedings of the ACM SIGOPS 22nd Symposium on Operating Systems Principles, ACM, 2009, 15 pages.

Breier, et al., "Anomaly Detection from Log Files Using Data Mining Techniques," Information Science and Applications, Springe, Berlin, Heidelberg, 2015, pp. 449-457.

Yu, et al, "Cloudseer: Workflow Monitoring of Cloud Infrastructures via Interleaved Logs," ACM SIGPLAN Notices, vol. 51, No. 4, ACM, 2016, 14 pages.

Meng, et al., "Driftinsight: Detecting Anomalous Behaviors in Large-scale Cloud Platform," 2017 IEEE 10th International Conference on Cloud Computing, pp. 230-237.

Nagaraj, et. al., "Structured Comparative Analysis of Systems Logs to Diagnose Performance Problems," NSDI, 2012, 14 pages.

"List of IBM Patents or Patent Applications Treated as Related," Jul. 21, 2020, 2 pages.

Xu, et al., "Detecting Large-Scale System Problems by Mining Console Logs," SOSP'09, Oct. 11-14, 2009, pp. 117-131.

* cited by examiner

| PROVISION ID | ERROR MSG_1 | ERROR MSG_2 | ERROR MSG_3 |
|---|---|---|---|
| PID1 | 0 | 1 | 1 |
| PID2 | 1 | 0 | 0 |
| PID3 | 0 | 1 | 0 |

| PROV ID 402 | STEP DURATION st$_d$ 404 | PROVISION PARAMETERS 406 ||||| TEMPLATED ERROR_1 408 | START TIME ERROR_1 410 | DURATION ERROR_1 412 | TEMPLATED ERROR_N 408 | START TIME ERROR_N 410 | DURATION ERROR_N 412 |
|---|---|---|---|---|---|---|---|---|---|---|---|---|
| | | IMAGE TYPE | OS TYPE | DISK CAPACITY | # OF CPUs | RAM SIZE | | | | | | |
| PID1 | 900 | CUSTOM | UBUNTU | 100 GB | 2 | 4096 | | | | | | |
| PID2 | 70 | CUSTOM | UBUNTU | 100 GB | 4 | 8192 | | | | | | |
| PID4 | 450 | CUSTOM | CENTOS | 25 GB | 1 | 1024 | | | | | | |

{ ALL ERRORS ENCOUNTER IN PROVISIONING STEP }

APPROACH TO AUTOMATED DETECTION OF DOMINANT ERRORS IN CLOUD PROVISIONS

BACKGROUND

Provisioning a virtual machine or baremetal server in the cloud involves a number of provisioning steps during which unstructured, timestamped logs are generated as the workflow progresses through the provisioning steps and reflects the provisioning status. Of the tens of thousands of virtual server infrastructure (VSI) provisions that happen per day, a few hundred provisions can end up in a stuck state during a given provisioning step. In order to determine the cause of a stuck provision, site reliability engineers (SRE) or cloud operations personnel (OPS) access multiple systems to determine the likely cause of the issue. Log data generated during the provisioning of a virtual machine or baremetal server (i.e., a single-tenant physical server) in the cloud captures the status of the provision. The event logs associated with the provisions can contain an abundance of error messages that are indicative of potential causes for stuck provision. However, analytics are still needed to aggregate and analyze the errors from various log sources to determine a specific error as the cause of the stuck provision.

SUMMARY

In an embodiment, a method for determining a dominant error causing a provisioning step to become stuck during a provision is disclosed. The method receives training provisioning data and generates a set of non-intervention provisioning data and a set of intervention provisioning data by identifying provisions from the training provisioning data that required intervention to complete. The set of non-intervention provisioning data includes a first set of provisions that do not have any recorded intervention. The set of intervention provisioning data includes a second set of provisions that have a recorded intervention. The method identifies errors that occurred for each of the provisions during the provisioning step in the set of intervention provisioning data. The method encodes the errors for each of the provisions that occurred during the provisioning step in the set of intervention provisioning data as a pre-intervention error or a post-intervention error. A pre-intervention error occurs before an intervention. A post-intervention error occurs after an intervention. The method determines a numeric statistic for each of the pre-intervention errors in the set of intervention provisioning data. The method determines the numeric statistic for each provision in the set of non-intervention provisioning data. The method determines a dominant error for a provision during the provisioning step in the set of intervention provisioning data. The dominant error for the provision during the provisioning step in the set of intervention provisioning data is a pre-intervention error that has a maximum value for the numeric statistic. The method determines the dominant error for the provision during the provisioning step in the set of non-intervention provisioning data. The dominant error for the provision during the provisioning step in the set of non-intervention provisioning data is a provisioning error that resulted in a value of the numeric statistic.

In another embodiment, a system is configured to determine a dominant error causing a provisioning step to become stuck during provisioning of a machine in a cloud environment. The system includes memory for storing instructions, and a processor configured to execute said instructions to determine an inverse error frequency (IEF) value for pre-intervention errors in a set of intervention provisioning data; determine a dominant error for a provision during said provisioning step in said set of intervention provisioning data based on a pre-intervention error that has a maximum IEF value; determine a duration frequency (DuF) value for the provision at said provisioning step for provisions in a set of non-intervention provisioning data; and determine said dominant error for each provision during said provisioning step in said set of non-intervention provisioning data based on an error that resulted in DuF value.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
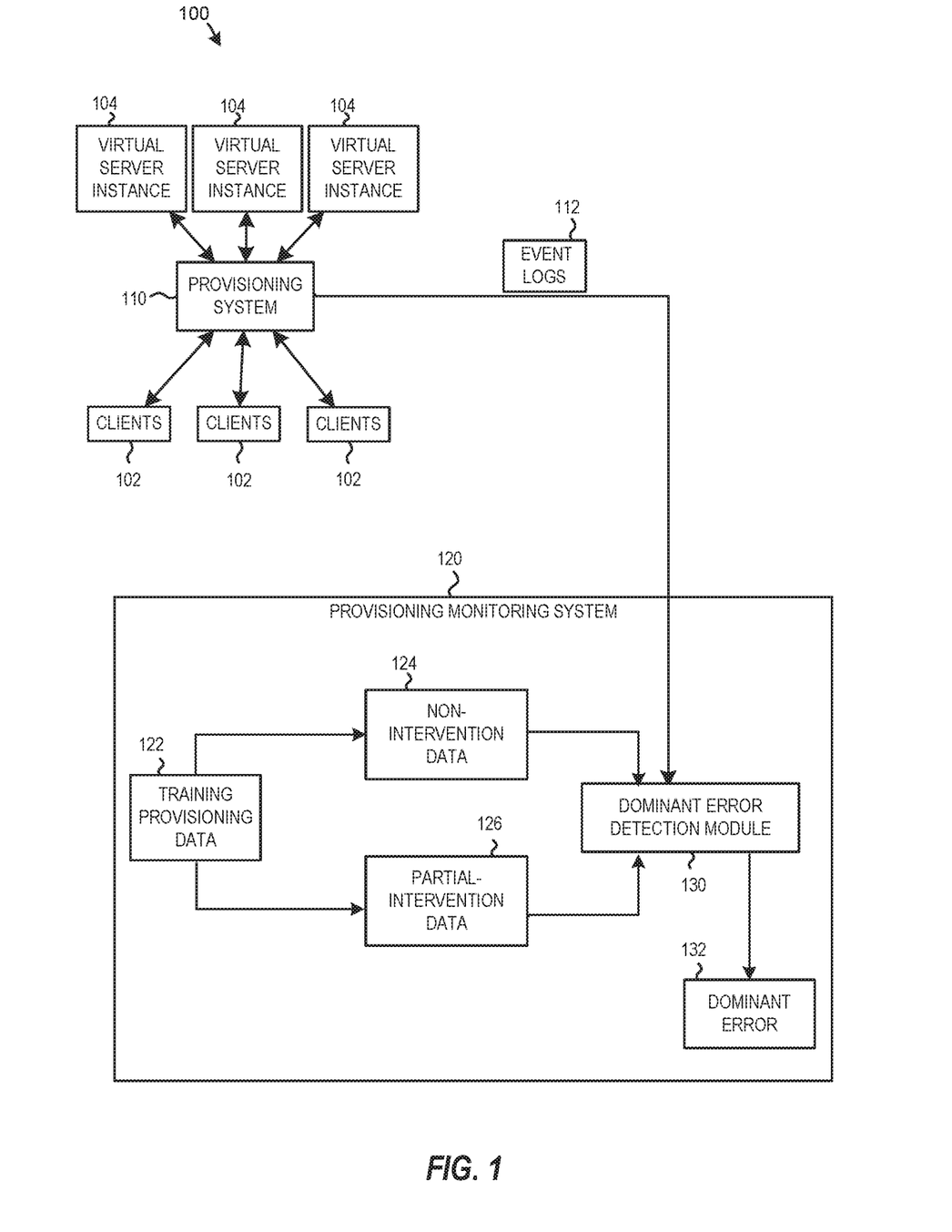
FIG. 1 is a schematic diagram illustrating a system for determining a dominant error causing a provisioning step to become stuck during provisioning of a machine in a cloud environment in accordance with an embodiment of the present disclosure.

The disclosed embodiments include an artificial intelligence (AI) system, method, and computer program product configured to determine the dominant error from a list of errors as the likely cause for the stuck provision in order to generate alert. In an embodiment, the AI system/method uses the knowledge of interventions to compute a numeric statistic to capture the relevance of errors for provisions. In an embodiment, AI system/method provides at test time, for every provision, a method for determination of a dominant error and a corresponding alert response using prediction and selection mechanism. The disclosed embodiments provide a high business value by improving mean-time-to-resolution, which in turn improves customer satisfaction FIG. 1 is a schematic diagram illustrating a system 100 for determining a dominant error causing a provision to be stuck in a provisioning step during the provisioning of a machine in a cloud environment in accordance with an embodiment of the present disclosure. The system 100 includes a provisioning system 110 to communicate with one or more clients 102 for the provisioning of one or more virtual server instance (VSI) 104. Alternatively, the disclosed embodiments can provision any of a variety of computing resources, including, but not limited to, a bare metal server or a VSI. For example, the clients 102 may request the provisioning system 110 to provision a VSI or baremetal server in the cloud. In an embodiment, the provisioning system 110 may perform the process of provisioning a VSI or baremetal server thousands of times a day. Each of the provisions can involve hundreds of steps during which unstructured, time-stamped event logs 112 are generated as the workflow progresses through the provisioning steps to reflect the provisioning status. During the provisioning process, a provision may become stuck (i.e., unable to advance or complete) during one or more of the provisioning steps. The event logs 112 can include various types of error messages that are indicative of potential causes for a stuck provision. For example, the event logs 112 for a provision at a provisioning step may have the following errors: (1) execution is currently not running, (2) the guest power state is not running; (3) the private interface 'ipaddr' is not pingable; and (4) the public interface address 'ipaddr' is not pingable. In an embodiment, these errors are ordered by the order of their appearance relative to the start of the provisioning step. For example, after a provision enters a certain provision step, error (4) appears first, followed by error (3), error (2) and then error (1). When there is more than 1 error associated with the provision, it is not evident which of the errors caused the provision to become stuck. This is because some errors may be emitted by the provisioning workflow system as a result of the provision being stuck in the provision step.

Provisions can complete without any interventions by human or systems, despite generating various types of errors such as debug errors or other non-fatal errors. Such provisions are called normal provisions. In practice, there is a lack of labels or annotations in the event logs or in any database to characterize such provisioning behavior. Human labeling of normal behavior is not an easy problem to handle due to the volume of daily provisions (e.g., fifty thousand provisions per day). On the other hand, anomaly detection systems such as those based on event frequency counts can be used to determine anomalous behavior of a provision in a provisioning step. However, anomaly detection systems cannot help in identifying the error that caused the provision to become stuck. Therefore, analytics are needed to aggregate and analyze the errors from various log sources in order to determine a specific error as the cause of the stuck provision.

To improve upon the existing methods, the present disclosure uses historic knowledge of provisions to determine a dominant error that is causing a provisioning step to become stuck. In an embodiment, once the dominant error is determined, a response category is determined based on the dominant error to indicate when, if necessary, to intervene with a provision. The response category could be immediate attention to the provision, delayed attention or no attention.

With reference to FIG. 1, in an embodiment a provisioning monitoring system 120 obtains the event logs 112 from the provisioning system 110. The provisioning monitoring system 120 includes a dominant error detection module 130 that is configured to determine a dominant error using the received event logs 112. The dominant error is the error that is responsible for a provision to be stuck in a provisioning step and prevents the provisioning from proceeding ahead to completion. In an embodiment, the dominant error detection module 130 is trained using historic training provisioning data 122. The training provisioning data 122 is broken into two discrete sets, a non-intervention data set 124 and a partial-intervention data set 126. The non-intervention data set 124 is training data for which there is no recorded intervention by humans or system. In an embodiment, the non-intervention data is obtained after excluding any outlier provisions. Provisions can exhibit outlier characteristics in a provision step by taking significantly more time to complete the provisioning step. Provisions could be outliers and yet not be intervened with for several reasons such as there is lack of resources for timely attention, or the underlying problem is being addressed in a different, but related provision. In an embodiment, outliers provisions can be identified using outlier detection techniques such as Local Outlier Factor (LOF) approach. The partial-intervention data set 126 is training data for which there is knowledge of intervention by humans or system. The term "partial" is used to denote that the partial intervention data 126 may not contain all provisions that would have benefitted from intervention. For example, because of the large number of provisions that occur, not all stuck provisions can be addressed by a limited number of cloud operations personnel. The disclosed embodiments would work as intended with complete intervention data, if present.

As will be further explained, using the historical provision knowledge, the dominant error detection module 130 computes a numeric statistic to capture the relevance of errors in determining a dominant error as a cause of a stuck provision. In particular, in an embodiment, the dominant error detection module 130 determines the maximum IEF value for a provision in the partial-intervention data set 126, and determines a DuF value for a provision in the non-intervention data set 124. In general, the IEF is used to highlight the importance of rare errors and to suppress more frequently occurring errors such as, but not limited to, debug errors. The occurrence of rare errors is a strong predictor for the intervention. The DuF is a statistic that gives importance to errors that are present for a longer period of time as compared to other errors for a given provision in a provisioning step. As stated above, the DuF is computed on the non-intervention data set 124 and is expressed as the maximum of error durations per provision. Thus, for the provisions in the non-intervention data set 124, the error having the maximum duration is likely the primary cause of the provision having to spend an extended amount of time at a provision step.

Figure 2:
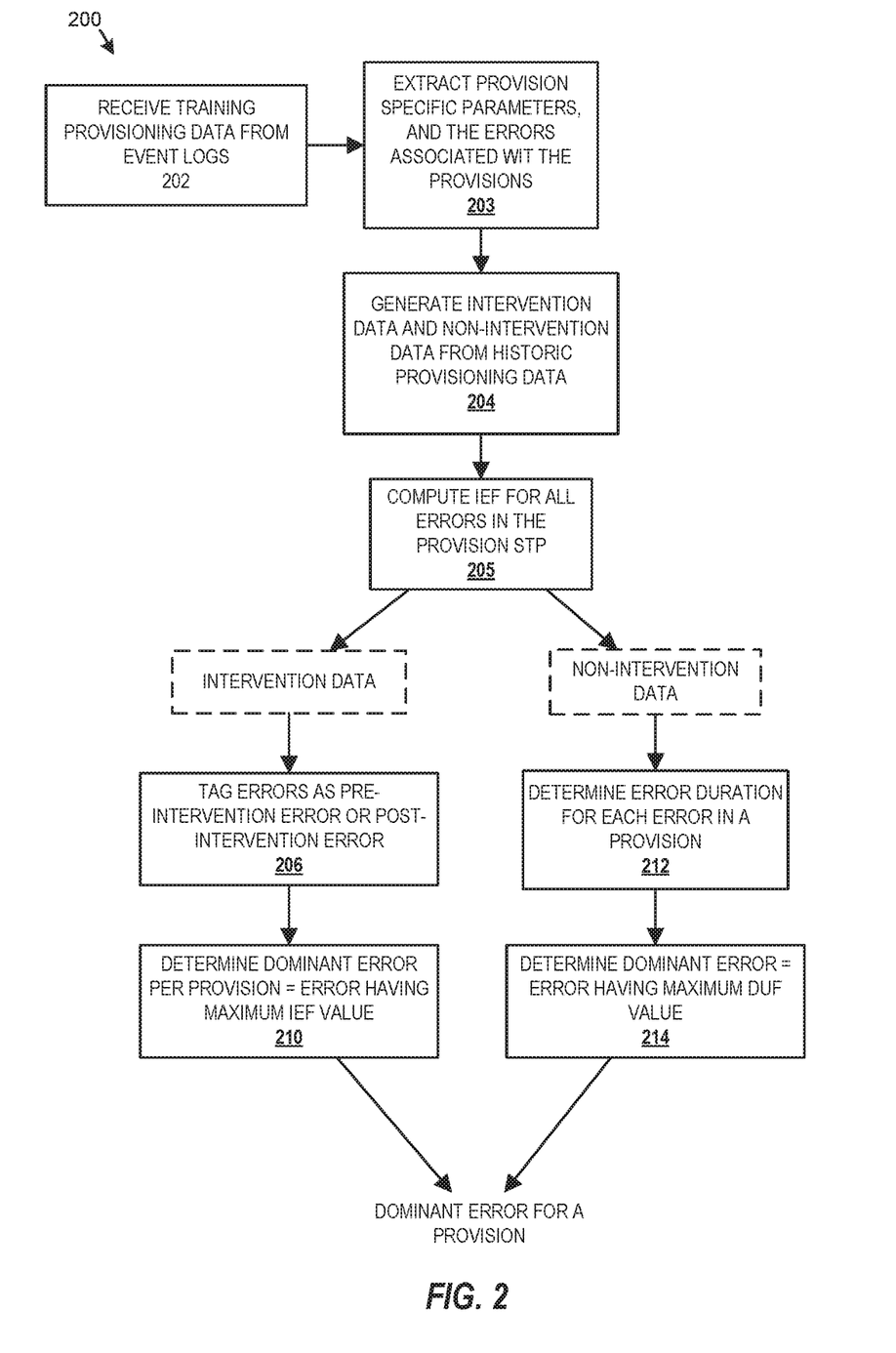
FIG. 2 is a flowchart diagram illustrating a method for determining a dominant error causing a provisioning step to become stuck during provisioning of a machine in a cloud environment in accordance with an embodiment of the present disclosure.

FIG. 2 is a flowchart diagram illustrating a method 200 for determining a dominant error causing a provisioning step to become stuck during provisioning of a VSI in a cloud environment in accordance with an embodiment of the present disclosure. The method 200 may be executed by a system such as, but not limited to, the provisioning monitoring system 120 in FIG. 1. Provisions are normally broken into individual steps, for example first an available host is located, then the network is configured, and afterwards storage is configured. The disclosed embodiments described herein can be applied to one step or multiple steps at a time.

Figure 4:
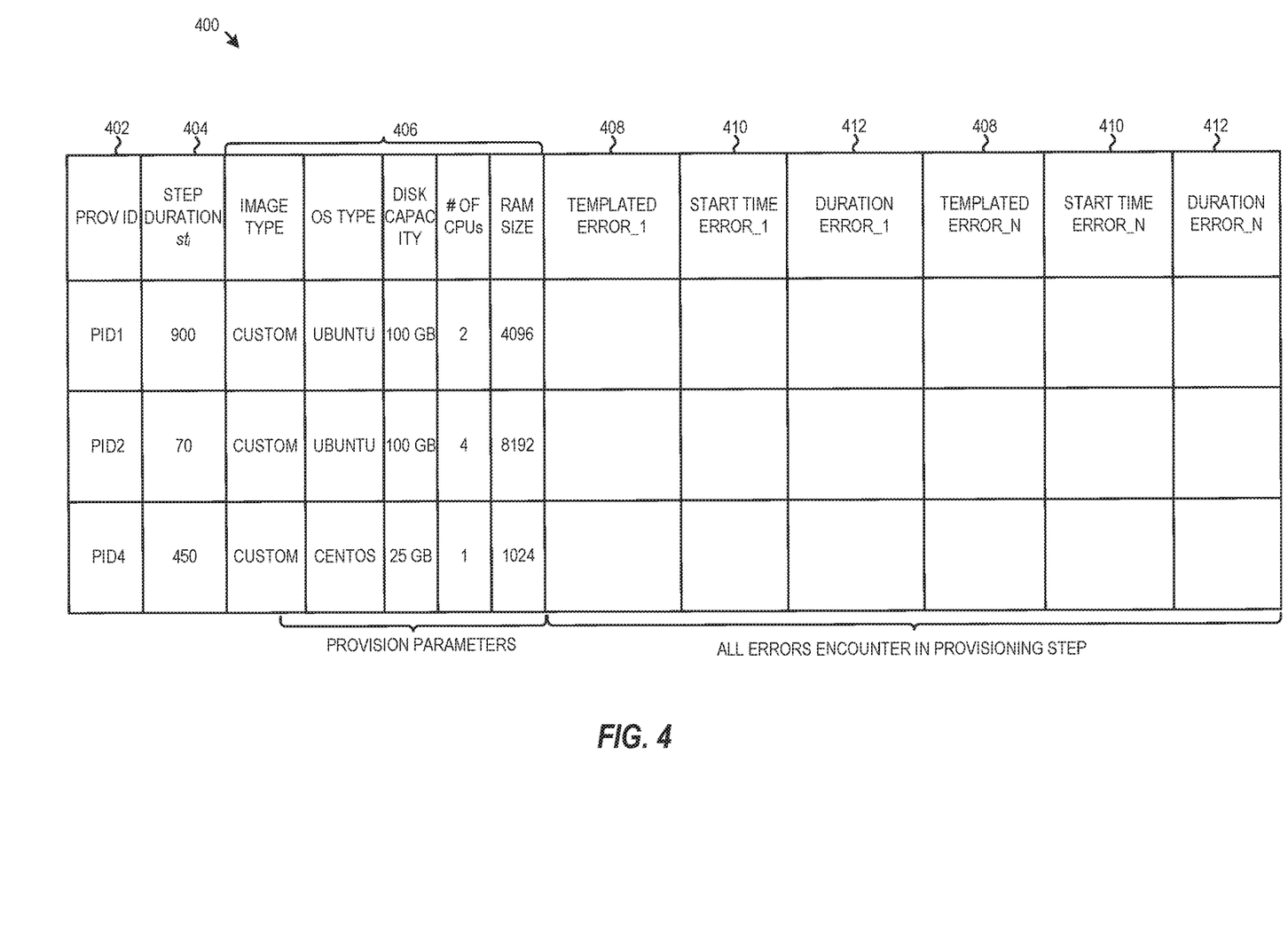
FIG. 4 is a data table diagram illustrating provisioning features in accordance with an embodiment of the present disclosure.

The method 200 begins at step 202 by receiving training provisioning data in the form of event logs. The term "logs" is used to refer to data from a variety of sources, potentially including data stored in a database. For provisions that occurred in a given time window, the method 200 in step 203 extracts provision specific features/parameters for every provision from the event logs to generate a data table. In an embodiment, some of the provision parameters could come from a database, as oppose to or in addition to event logs. An embodiment of the provisioning features includes provision parameters 406, as shown in FIG. 4. Additional features specific to a provision in a provision step are computed including step duration ($st_i$) 404 and templated errors 408, associated with a provisioning step. In an embodiment, the method 200 determines for every provision in a provision step, the step duration ($st_i$) 404 by identifying timestamp ($t_{start_i}$) of the message or event in the event logs that indicates the beginning of the provisioning step and time stamp ($t_{stop_i}$) of message or event that indicates the end of the provisioning step. The step duration $st_i$ 404 is computed as $st_i=(t_{stop_i}-t_{start_i})$. The error messages associated with a provision in a provision step may have some provision specific details like the internet protocol (IP) address, device ID information, or other information specific to a particular provision. Towards designing analytic solutions for the analysis of errors, the errors are aggregated by removing the provision specific information from the error messages to create the templated errors 408. In an embodiment, for a given provision step, the data table consists of a list of provisions with provision ID 402, the provision step duration $st_i$ 404, provision specific parameters 406, and templated errors 408, the start time 410 of each error and the duration 412 of each error that occurs in the provision step. In an embodiment, the method 400 determines for every error $error_i$ in a provision in a provision step, the error duration ($ed_i$) 412 by identifying timestamp ($et_{start_i}$) 410 of the message or event in the event logs that indicates the beginning of the error and time stamp ($et_{stop_i}$) of message or event that indicates the end of the same error in the said provision during the provisioning step. The error duration $ed_i$ 412 is computed as $ed_i=(et_{stop_i}-et_{start_i})$.

Referring back to FIG. 2, the method 200 at step 204 generates a set of non-intervention provisioning data and a set of intervention provisioning data. The intervention provision dataset consists of provisions from the training provisioning data that required intervention to complete. The set of non-intervention provisioning data includes provisions that do not have any recorded intervention. At step 205, the method 200 determines an IEF value for every templated error seen in a provision step in a given time window. In a provision step, for each templated error $e_i$, the number of provisions affected by the error is determined. This is given by the value $N_i$. The number of provisions affected could be from the intervention set or non-intervention set or both. If a is the number of provisions in the intervention dataset with the templated error $e_i$, wherein the error occurs prior to intervention (which is determined using method 200) as a pre-intervention error and b is the number of provisions in the non-intervention dataset with this error, then the total number of provisions affected by this error is $N_i=a+b$. Additionally, the total number of provisions that entered the provision step during the same time window is computed. This is given by the value N. In an embodiment, the IEF value for a templated error $e_i$ is determined using the following equation: $\log N/N_i$. The IEF value provides greater significance to rare occurring errors versus more frequently occurring errors. Errors that occur infrequently, such as those warranting attention via intervention have large IEF values, whereas frequently occurring errors such as debug errors have small IEF values.

In an embodiment, the method 200, at step 206 tags the errors seen by a provision in the intervention dataset as either a pre-intervention error or a post-intervention error. In an embodiment, an error that occurs before an intervention has a tagged value of 1 and an error that occurs after an intervention has occurred has a tagged value of 0. Such a tagging is done to distinguish errors (pre intervention errors) that potentially contribute to a provision being stuck from the errors that appear after an intervention occurs (and before the issue is fully resolved). The latter are termed as the post intervention errors. Such errors reflect other issues occurring as a consequence of the provision being in a stuck state.

The method 200 at step 210, determines the dominant error for every provision in the set of intervention provisioning data as the pre-intervention error that has a maximum IEF value. For instance, if there are j errors (j is a number say 6) for an intervened provision in provision step, then the dominant error is the error that has the maximum IEF value from the j IEF values corresponding to the j errors. If two errors with the same IEF occur in an intervened provision, then the error with the earliest timestamp is assigned as the dominant error for the provision. Here, the timestamps are ordered relative to the start of the provision step for a given provision. Specifically, if there are two errors e1 and e2 with the same IEF value, and the error e1 occurs at time t1 and error e2 occurs at time t2 such that t1<t2 and (t1−t_start)<(t2−t_start), then the dominant error of the intervened provision is assigned as e1. In this way, for all N provisions in the intervention data, N dominant errors are identified, wherein every provision has 0 or 1 dominant error. A provision with no error will be assigned "no error" as the dominant error.

For the provisions in the set of non-intervention provisioning data, the method 200 at 212 determines the error duration value for each error that occurred during the provision at the provisioning step and computes the DuF for the provision as the maximum of the computed error durations. It is a value that provides greater significance to errors that are present for a longer period of time as compared to other errors for a given provision at a provisioning step in the set of non-intervention provisioning data. In an embodiment, for every provision in a provision step, the error duration ($ed_i$) associated with an error $error_i$ is computed as the difference between the error start time (as captured by timestamp of message or event in the event logs that captures the first occurrence of the error in the provision in the provisioning step) and the error end time (as indicated by the timestamp of message or event in the event logs that captures the last occurrence of the error in the provision in the provisioning step). The DuF for the provision is the maximum of the computed error durations, for the provision in the given step. The method 200 at 214 determines the dominant error for each provision during the provisioning step in the set of non-intervention provisioning data, as the error that resulted in the DuF value. For instance, in a provision step, if there are 3 errors (say error1, error2, error3) seen by the provision that is in the non-intervention dataset, with error durations [50, 100, 70], then DuF is computed as the maximum of the 3 error durations and is assigned the value 100. The dominant error for the provision is the error that resulted in the computed DuF value. In the example above, since error 2 resulted in the DuF of 100, it is assigned as the dominant error for the provision. Using the method 200, the dominant error for all provisions in both the set of intervention provisioning data and the set of non-intervention provisioning data can be determined.

Figure 3:
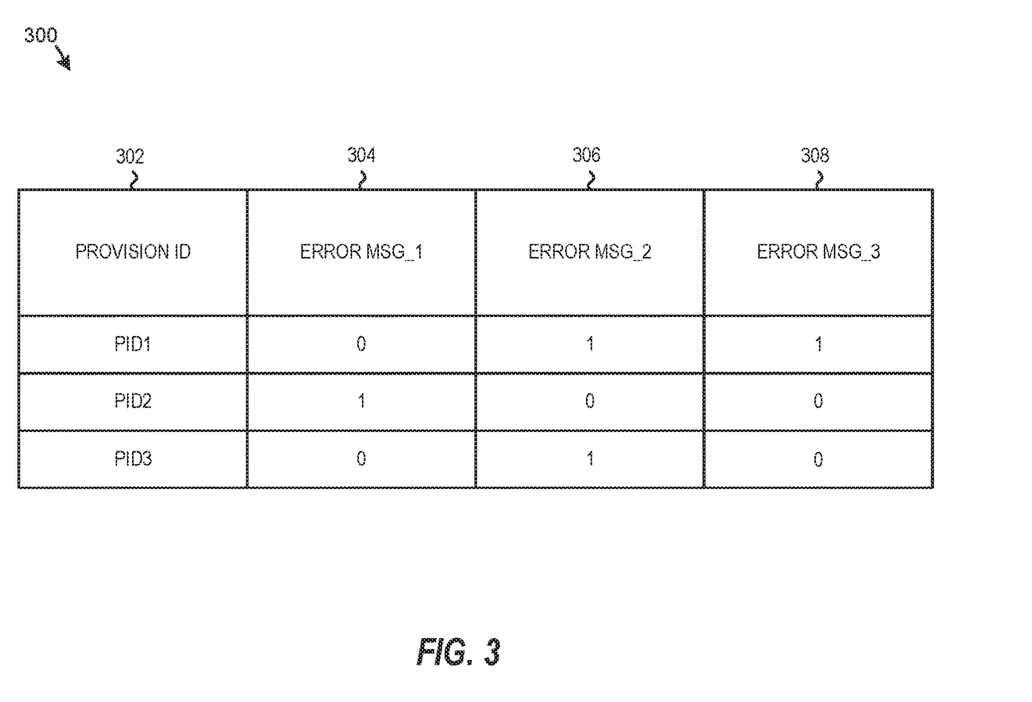
FIG. 3 is a data table diagram illustrating the encoding based on the time of occurrence of errors for the provisions in the intervention data in a given provisioning step in accordance with an embodiment of the present disclosure.

FIG. 3 is a data table 300 illustrating the tagging of the errors for each of the provisions that are part of the intervention dataset in accordance with an embodiment of the present disclosure. The data table 300 can be generated by the provisioning monitoring system 120 in FIG. 1 during step 206 of method 200 in FIG. 2. The data table 300 includes a provisioning identifier (ID) column 302 and a column for every error message in the provision step. For the purpose of illustration, the data table 300 depicts only 3 error messages namely, ERROR MSG_1 in column 304, ERROR MSG_2 in column 306, and ERROR MSG_3 in column 308. The provisioning ID column 302 stores a unique identifier associated with each provision. In an embodiment, for each of the error messages, if the error occurred in a given provision step for a provision and before an intervention occurs for the same provision (pre intervention error), then the error is tagged with a value 1, and if the error occurs after the intervention (post intervention error) for the same provision or doesn't occur in the provision at all, then the error is tagged with a value 0. These tags are later used to identify all a pre-intervention errors for IEF determinations as described in FIG. 2. In data table 300, for the provision with its unique identifier PID1, ERROR MSG_1 has a tag of 0 whereas, ERROR MSG_2, ERROR MSG_3 have tag of 1.

This is because ERROR MSG_1 did not occur in the provisioning step, as part of provisioning of the provision with PID1. On the other hand, ERROR MSG_2, ERROR MSG_3 occurred before the intervention by a human or system. The dominant error will be determined based on the IEF values associated with ERROR MSG_2, ERROR MSG_3. Specifically, if ERROR MSG_2 has a larger IEF value compared to ERROR MSG_3, then ERROR MSG_2 is assigned as the dominant error for the said provision in the provision step. Conversely, if ERROR MSG_3 has a larger IEF value compared to ERROR MSG_2, then ERROR MSG_3 is assigned as the dominant error for the said provision in the provision step. For the provision with its unique identifier PID3, ERROR MSG_2 is a pre-intervention error and has a tag of 1 whereas, ERROR MSG_1, ERROR MSG_3 have tag of 0. This is because ERROR MSG_2 occurred before the provision was intervened with, by a human or system. On the other hand, ERROR MSG_1, ERROR MSG_3 occurred after the intervention by a human or system. In a provision step, errors do not always appear in the same order and some errors may not appear at all, when analyzed across various provisions. For instance, in the provision with PID1, ERROR_3 may appear before ERROR_2, whereas in the provision with PID3, ERROR_2 may appear before ERROR_3. The reason for this lack of ordering in the occurrence of errors is due to the fact that modern provisioning systems follow complex workflows. The workflow execution sequence may be based on the provisioning configuration desired by the customer, who is trying to provision a VSI or baremetal in the cloud.

FIG. 4 is a data table 400 illustrating provisioning features in accordance with an embodiment of the present disclosure. In an embodiment, the data table 400 can be generated by the provisioning monitoring system 120 in FIG. 1. The data table 400 includes one or more columns for the provisioning ID 402, the step duration ($st_i$) 404, the provision parameters 406, and all templated errors associated with a provisioning step for each of the provisions indicated by the provision ID 402. In an embodiment, the step duration ($st_i$) 404 is determined by extracting the timestamp of the message or event in the event logs that indicate the beginning of the provisioning step ($t_{start}$) and the timestamp of the message or event in the event logs that corresponds to the end of the provisioning step, $t_{stop}$ (e.g., $st_i=(t_{stop}-t_{start})$). In an embodiment, a user can specify the provision parameters 406. Non-limiting examples of provision parameters 406 can include image type, operating system (OS) type, disk capacity, number of central processing units (CPUs), and random-access memory (RAM) size as shown in the data table in FIG. 4. The templated errors 408 contains error messages that have had specific provision details such as, but not limited to, the internet protocol (IP) address, device ID information, or other information specific to a particular provision removed. Templating of errors is done as part of preprocessing in order to make error messages look similar and to further facilitate aggregation of such errors. In an embodiment, the templated errors are additionally mapped to unique numbers. This process is known as encoding and results in the encoded error values. The encoded error values are numbers such as 0, 1, 2, etc., where each number maps to a unique templated error. The specific case where provisions have no errors associated with them in a given step is also given unique encoded error value corresponding to "no error". Other non-numeric provision parameters may also be converted into corresponding encoded values in a similar manner. The columns of the data table 400 consist of all templated errors seen as part of the provision step. In an embodiment, some error values for a provision may be NULL to indicate that the specific error did not appear during the provision. The data table 400 in column 410 captures the start time for every error that occurs in the provision. If an error does not occur in a provision, the start time for such errors is set to NULL. The data table 400 also includes an error duration 412 for each templated error 408, which is computed as the difference between the times when the error was last seen and first seen after the provision entered a provision step. For provisions with NULL templated error values, the corresponding error duration is set to 0.

Figure 5:
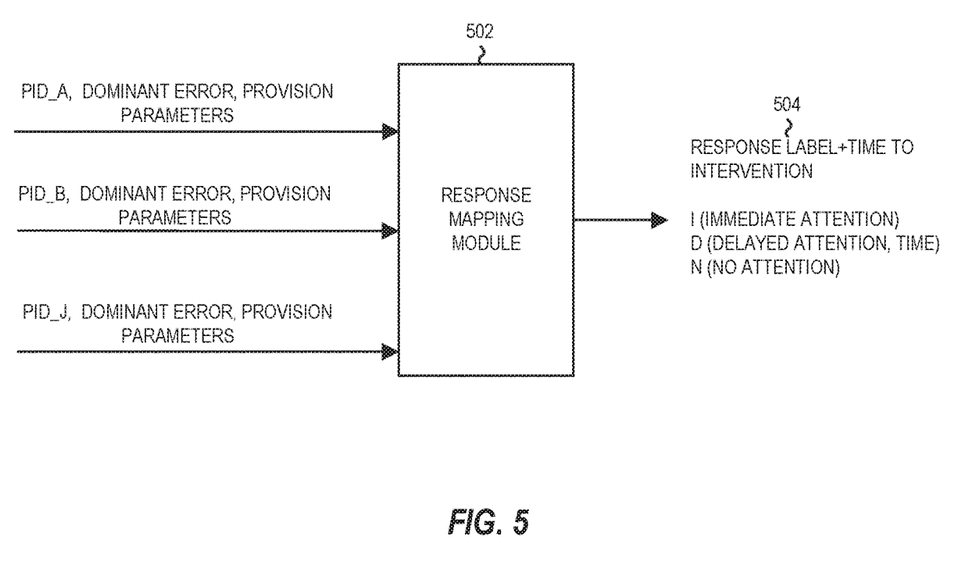
FIG. 5 is schematic diagram illustrating the use of the dominant error for determining a response category in accordance with an embodiment of the present disclosure.
Figure 6:
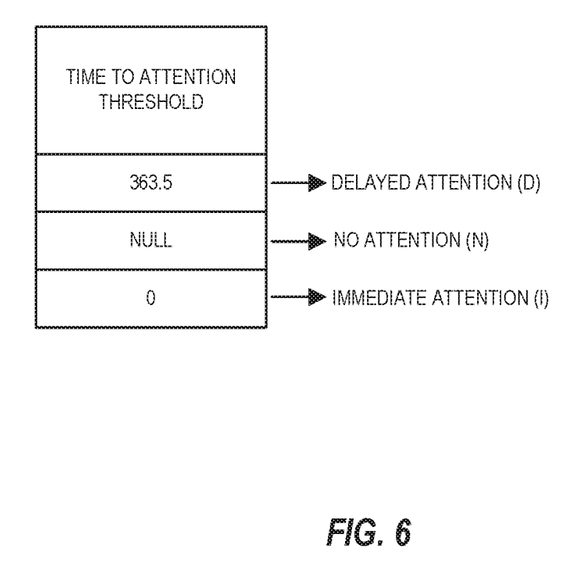
FIG. 6 is a data table diagram illustrating the mapping from time-to-attention value to a response category in accordance with an embodiment of the present disclosure

FIG. 5 is schematic diagram illustrating the use of the dominant error for determining a response category in accordance with an embodiment of the present disclosure. In the depicted embodiment, the provision ID, the dominant error determined for each provisioning, and the provision parameters are input into a response mapping module 502. In an embodiment, the response mapping module 502 may be implemented as part of the provisioning monitoring system 120 in FIG. 1. In an embodiment, the response mapping module 502 trains a supervised classifier to output one the following response label pair 504 for a provision: (I, 0), (D,T) or (N,NULL) corresponding to Immediate Attention, Delayed Attention or No Attention. The output response label is a pair where the first value is the response category for the intervention, and the second value is the time to attention. The output response category is based on the Time to Attention and is determined as follows: assign label N if the Time to Attention is NULL, assign I if the Time to Attention is 0 and assign label D if the Time to Attention is greater than 0, but not NULL. Time to Attention is NULL when there are no issues with the provision and it is not in a stuck state. Dominant errors for such provisions may include errors such as "no error" or debug errors. When time to attention is 0, these provisions are stuck and can progress only after intervention. For such provisions, the response category is "immediate attention." When time to attention is T, these provisions are stuck, but due to the nature of the error, waiting for time T prior to intervention, could help these provisions to self-resolve. The response mapping module provides a mapping from the time-to-attention to the corresponding response label for a provision step. In an embodiment, FIG. 6 shows the mapping from time to attention to the corresponding response label for a provision step. While the time to attention for immediate attention will be 0 and no attention will be NULL for all the provision steps, the time to attention values for delayed attention would be specific to a certain step.

Figure 7:
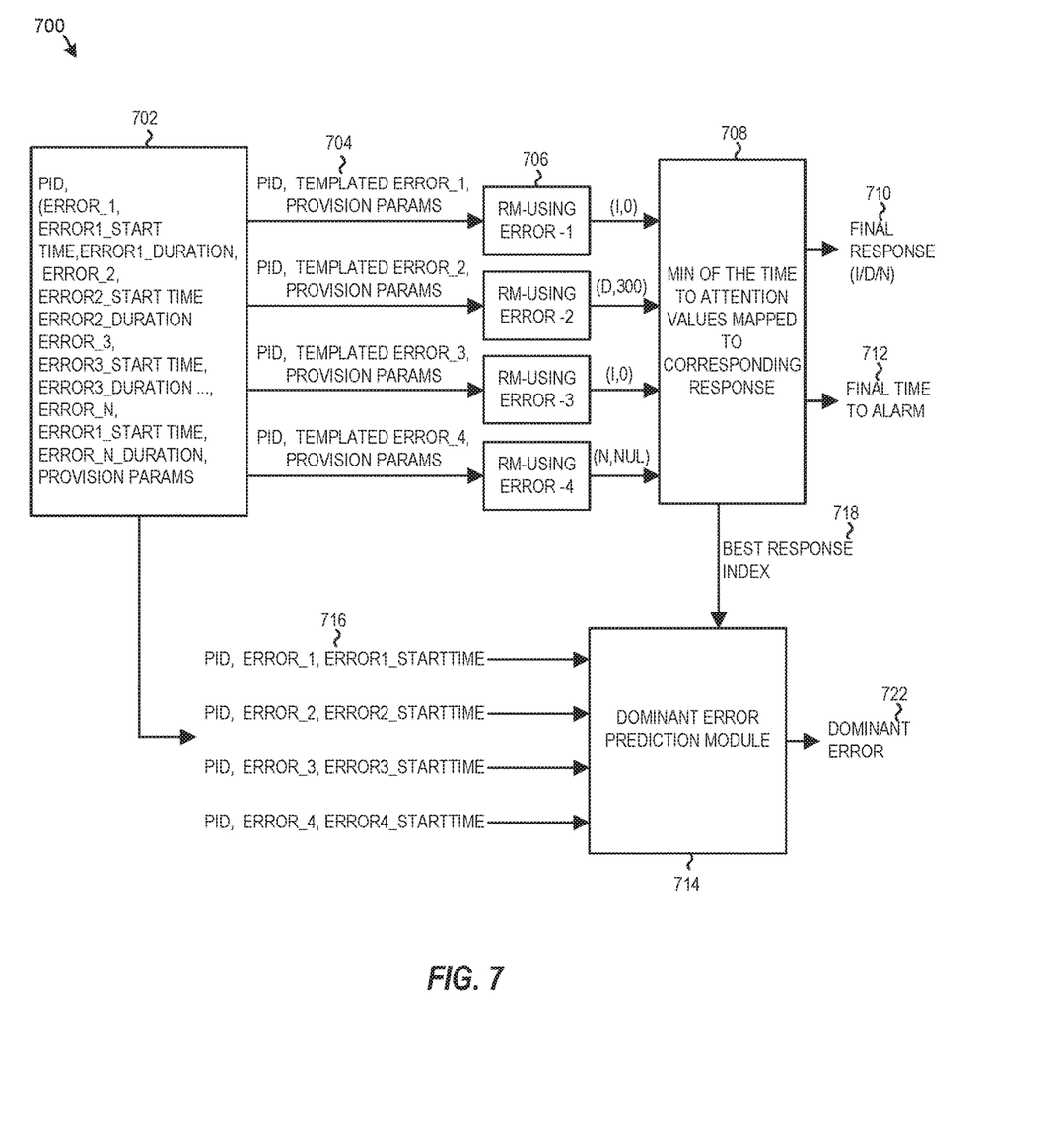
FIG. 7 is schematic diagram illustrating a dominant error and output response prediction process in accordance with an embodiment of the present disclosure.

FIG. 7 is a schematic diagram illustrating a dominant error and output response prediction process 700 in accordance with an embodiment of the present disclosure. In an embodiment, where the test data is from disjoint time periods compared to the training data, prediction process 700 can be used to predict the dominant error and the output response for the test data. During prediction, the dominant error and output response prediction process 700 receives event logs that includes a provision 702 with n errors, the error start time for each of the n errors, the error duration for each of the n errors and provision parameters as described in FIG. 4. The errors in the provision are templated as part of pre-processing in order to make error messages look similar and to further facilitate comparison with the errors that the response mapping module has seen before. Based on the n templated errors 704, n inputs are provided (one at a time) to the response mapping module 706 to predict n output label pairs of response label and time to attention. In an embodiment, for the provision PID1 (PID1, templated error1, provision parameters) is used to predict the output response label (I, 0). Here I implies "immediate attention" and time to attention is 0. Using inputs (PID2, templated error 2, provision parameters), the predicted output response label is (D, 300). Here D implies delayed attention response and time to attention is delayed i.e., any intervention should be after time T=300 of the provision entering the provision step. Using inputs (PID3, templated error 3, provision parameters), the predicted output response label (I, 0). Here I implies immediate attention and time to attention is 0. Using inputs (PID4, templated error 4, provision parameters), the predict output response label (N, NULL). Here N implies no attention and time to attention is NULL or no intervention is needed. The reason for error 4 leading to "No Attention" could be due to nature of the error 4 such as "no error" or "debug errors". In an embodiment, at block 708, the minimum of the time to attention values (output by the response module 706) is set as the final time-to-alarm 712 value. The final time to alarm 712 is used to generate the predicted output response label 710 of I (Immediate Attention) or D (Delayed Attention) or N (No Attention) based on the response mapping for a provision step as shown in FIG. 6. In an embodiment, block 708 also outputs the index of the time to attention value (hereby referred to as 'best response index') 718 that led to the determination of the "final" time-to alarm value. The best response index that led to the determination of the "final" time to alarm value could be one index or more indices (in case of a tie). In an embodiment, final time to alarm value is the minimum of (0, 300, 0, NULL) which is zero (0). Consequently, the best response indices are [1, 3] (this assumes that indexing starts at value 1). Furthermore, zero maps to immediate attention and is therefore the final output response for this provision. In an embodiment, a dominant error prediction module 714 is configured to determine a dominant error 722 causing the provision to be stuck, by taking as input the templated errors and their start times 716, and the best response index 718 and mapping to the error associated with the best response index. The best response index could be 1 or more indices (in case of a tie). In the latter scenarios, the dominant error 722 is determined based on the error with the earliest start times. In an alternate embodiment, the prediction is performed on streaming or real time data, where the real time prediction system receives log data for a single error at a time, along with the provision parameters for a given provision step. The response mapping module 706 in such a system would generate the single response label pair. If the label is I (or Immediate Attention) then the associated error is the dominant error 722. If the label is N (or No Attention) then there is no dominant error 722. If the label is D (or Delayed Attention) and the provision has exceeded the time to attention associated with the response label D, then the associated error is labeled as the dominant error 722.

Using the disclosed embodiments on a sample size of 200,000 provisions over 15 day period, the disclosed embodiments improved error analysis for determining errors leading to interventions as compared to selecting the first (or last or a random combination) of the observed errors as a cause of stuck provision. This resulted in significantly improved true positive rates (TPR) due to the decrease in false negatives. Additionally, the disclosed embodiments captured true positives with very few false positives. True positive rate is measured in terms of the number of true positives and the number of false positives. A provision is a true positive when there is evidence of intervention by humans as well as the response classification is of "immediate attention" or "delayed" attention. A provision is a false positive when there is no evidence of intervention by humans but the response label is assigned as "immediate attention" or "delayed" attention. Likewise, a provision is a true negative when there is no evidence of intervention by humans as well as the response label is assigned as "no attention". A false negative is when the provision is intervened by humans because it is stuck, but the assigned response label is "no attention".

Figure 8:
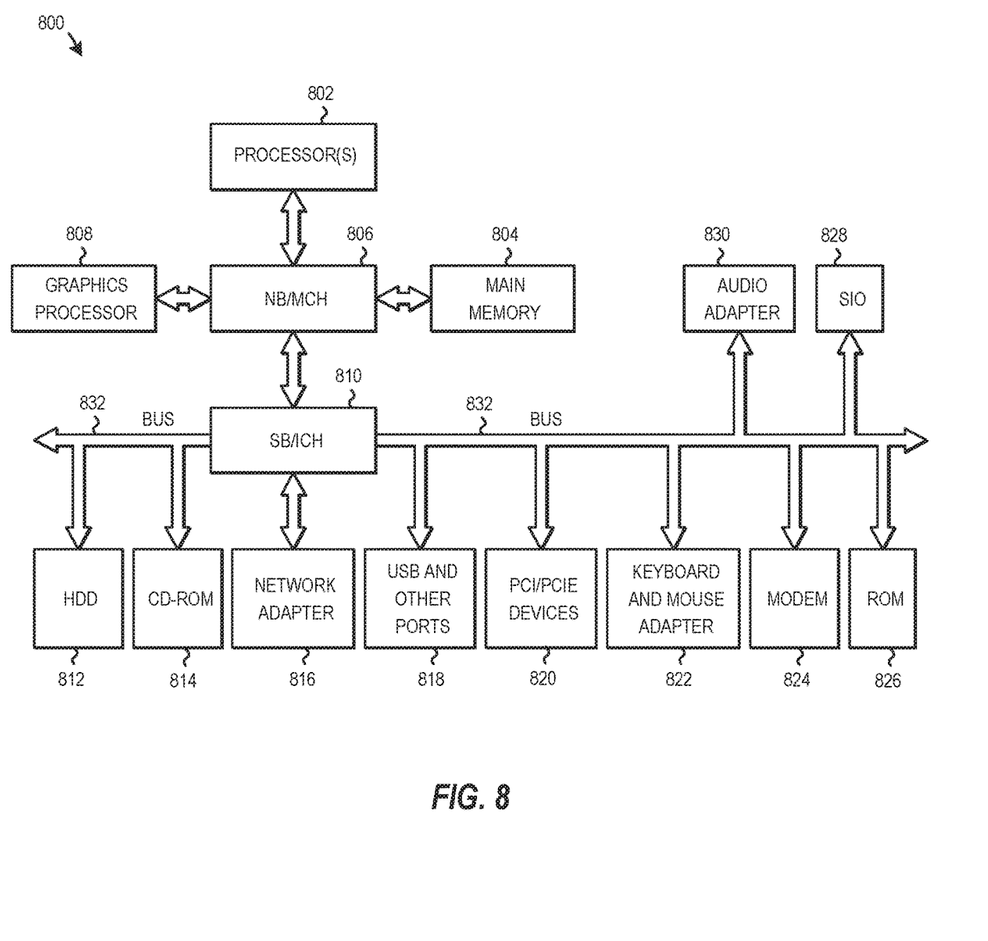
FIG. 8 is a block diagram illustrating a hardware architecture of a system according to an embodiment of the present disclosure in which aspects of the illustrative embodiments may be implemented.

FIG. 8 is a block diagram illustrating a hardware architecture of a system 800 according to an embodiment of the present disclosure in which aspects of the illustrative embodiments may be implemented. For example, the data processing system 800 may be configured to store and execute instructions for performing the process described in FIGS. 2-6. In the depicted example, the data processing system 800 employs a hub architecture including north bridge and memory controller hub (NB/MCH) 806 and south bridge and input/output (I/O) controller hub (SB/ICH) 810. Processor(s) 802, main memory 804, and graphics processor 808 are connected to NB/MCH 806. Graphics processor 808 may be connected to NB/MCH 806 through an accelerated graphics port (AGP). A computer bus, such as bus 832 or bus 834, may be implemented using any type of communication fabric or architecture that provides for a transfer of data between different components or devices attached to the fabric or architecture.

In the depicted example, network adapter 816 connects to SB/ICH 810. Audio adapter 830, keyboard and mouse adapter 822, modem 824, read-only memory (ROM) 826, hard disk drive (HDD) 812, compact disk read-only memory (CD-ROM) drive 814, universal serial bus (USB) ports and other communication ports 818, and peripheral component interconnect/peripheral component interconnect express (PCI/PCIe) devices 820 connect to SB/ICH 810 through bus 832 and bus 834. PCI/PCIe devices may include, for example, Ethernet adapters, add-in cards, and personal computing (PC) cards for notebook computers. PCI uses a card bus controller, while PCIe does not. ROM 826 may be, for example, a flash basic input/output system (BIOS). Modem 824 or network adapter 816 may be used to transmit and receive data over a network.

HDD 812 and CD-ROM drive 814 connect to SB/ICH 810 through bus 834. HDD 812 and CD-ROM drive 814 may use, for example, an integrated drive electronics (IDE) or serial advanced technology attachment (SATA) interface. In some embodiments, HDD 812 may be replaced by other forms of data storage devices including, but not limited to, solid-state drives (SSDs). A super I/O (SIO) device 828 may be connected to SB/ICH 810. SIO device 828 may be a chip on the motherboard configured to assist in performing less demanding controller functions for the SB/ICH 810 such as controlling a printer port, controlling a fan, and/or controlling the small light emitting diodes (LEDS) of the data processing system 800.

The data processing system 800 may include a single processor 802 or may include a plurality of processors 802. Additionally, processor(s) 802 may have multiple cores. For example, in one embodiment, data processing system 800 may employ a large number of processors 802 that include hundreds or thousands of processor cores. In some embodiments, the processors 802 may be configured to perform a set of coordinated computations in parallel.

An operating system is executed on the data processing system 800 using the processor(s) 802. The operating system coordinates and provides control of various components within the data processing system 800 in FIG. 8. Various applications and services may run in conjunction with the operating system. Instructions for the operating system, applications, and other data are located on storage devices, such as one or more HDD 812, and may be loaded into main memory 804 for execution by processor(s) 802. In some embodiments, additional instructions or data may be stored on one or more external devices. The processes described herein for the illustrative embodiments may be performed by processor(s) 802 using computer usable program code, which may be located in a memory such as, for example, main memory 804, ROM 826, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An automated method for provisioning a machine in a cloud environment, the method comprising:
   receiving training provisioning data;
   generating a set of non-intervention provisioning data and a set of intervention provisioning data by identifying provisions from the training provisioning data that required intervention to complete, wherein the set of non-intervention provisioning data comprises a first set of provisions that do not have any recorded intervention, and wherein the set of intervention provisioning data comprises a second set of provisions that have a recorded intervention;
   identifying errors that occurred for each of the provisions during a provisioning step in the set of intervention provisioning data;
   encoding the errors for each of the provisions that occurred during the provisioning step in the set of intervention provisioning data as one of a pre-intervention error and a post-intervention error, wherein the pre-intervention error occurred before an intervention, and wherein the post-intervention error occurred after the intervention;
   determining a numeric statistic for each of the pre-intervention errors in the set of intervention provisioning data;
   determining the numeric statistic for each provision in the set of non-intervention provisioning data;
   determining a dominant error for a provision during the provisioning step in the set of intervention provisioning data, wherein the dominant error for the provision during the provisioning step in the set of intervention provisioning data is a pre-intervention error that has a maximum value for the numeric statistic;
   determining the dominant error for the provision during the provisioning step in the set of non-intervention provisioning data, wherein the dominant error for the provision during the provisioning step in the set of non-intervention provisioning data is a provisioning error that resulted in a value of the numeric statistic;
   determining based on the dominant error whether waiting a certain time period may enable the provisioning of the machine in the cloud environment to self-resolve without requiring the intervention when the provisioning step becomes stuck during the provisioning of the machine in the cloud environment; and progressing with the provisioning of the machine in the cloud environment after the provisioning has self-resolved when the dominant error indicates that waiting the certain time period may enable the provisioning to self-resolve without requiring the intervention.

2. The method of claim 1, wherein the numeric statistic is an Inverse Error Frequency (IEF) value for an error determined using the following equation: Log {total number of provisions in the provisioning step/(sum of a number of provisions in the set of non-intervention data containing the error and a number of provisions in the set of intervention provisioning data containing the error prior to the intervention)}.

3. The method of claim 1, further comprising:
   determining a duration frequency (DuF) value for every provision at the provisioning step for provisions in the set of non-intervention provisioning data; and
   determining the dominant error for each provision during the provisioning step in the set of non-intervention provisioning data, wherein the dominant error for the provision during the provisioning step in the set of non-intervention provisioning data is the provisioning error that resulted in the DuF value, computed as a maximum of error durations for the provision.

4. The method of claim 3, further comprising training a model based on the dominant error determined for each provision at each provisioning step of the provision.

5. The method of claim 4, further comprising receiving a set of event logs associated with a provisioning step of a test provision; and
   determining from the set of event logs a predicted dominant error for the provisioning step of the test provision.

6. The method of claim 5, further comprising determining from the set of event logs a step duration of the provisioning step, all errors that occur as part of the provisioning step, and an error duration for each of the errors.

7. The method of claim 5, further comprising:
   determining a response category for the test provision and the predicted dominant error.

8. A system configured to provision a machine in a cloud environment, the system comprising memory for storing instructions, and a processor configured to execute the instructions to:
   determine an inverse error frequency (IEF) value for pre-intervention errors in a set of intervention provisioning data;
   determine a dominant error for a provision during a provisioning step in the set of intervention provisioning data, wherein the dominant error for the provision during the provisioning step in the set of intervention provisioning data is a pre-intervention error that has a maximum IEF value;
   determine a duration frequency (DuF) value for each provision at the provisioning step for provisions in a set of non-intervention provisioning data;
   determine the dominant error for each provision during the provisioning step in the set of non-intervention provisioning data, wherein the dominant error for the provision during the provisioning step in the set of non-intervention provisioning data is as an error that resulted in the DuF value, computed as a maximum of error durations for the provision;
   determine based on the dominant error whether waiting a certain time period may enable the provisioning of the machine in the cloud environment to self-resolve without requiring the intervention when the provisioning step becomes stuck during the provisioning of the machine in the cloud environment; and
   progress with the provisioning of the machine in the cloud environment after the provisioning has self-resolved when the dominant error indicates that waiting the certain time period may enable the provisioning to self-resolve without requiring the intervention.

9. The system of claim 8, wherein the processor is further configured to execute the instructions to generate the set of intervention provisioning data and the set of non-intervention provisioning data from historic provisioning data.

10. The system of claim 8, wherein the processor is further configured to execute the instructions to encode errors for each of the provisions that occurred during the provisioning step in the set of intervention provisioning data as one of a pre-intervention error and a post-intervention error.

11. The system of claim 8, wherein the processor is further configured to execute the instructions to train a model based on the dominant error determined for each provision at each provisioning step of the provision.

12. The system of claim 11, wherein the processor is further configured to execute the instructions to:
   receive a set of event logs associated with a provisioning step of a test provision; and
   determine from the set of event logs a predicted dominant error for the provisioning step of the test provision.

13. The system of claim 12, wherein the processor is further configured to execute the instructions to determine from the set of event logs a step duration of the provisioning step, all errors that occur as part of the provisioning step, and an error duration for each of the errors.

14. The system of claim 12, wherein the processor is further configured to execute the instructions to determine a response category for the test provision and the predicted dominant error.

15. A computer program product for provisioning a machine in a cloud environment, the computer program product comprising a computer readable storage medium having program instructions embodied therewith, the program instructions executable by a processor of a system to cause the system to:
   determine an inverse error frequency (IEF) value for pre-intervention errors in a set of intervention provisioning data;
   determine a dominant error for a provision during a provisioning step in the set of intervention provisioning data, wherein the dominant error for the provision during the provisioning step in the set of intervention provisioning data is a pre-intervention error that has a maximum IEF value;
   determine a duration frequency (DuF) value for each provision at the provisioning step for provisions in a set of non-intervention provisioning data;
   determine the dominant error for each provision during the provisioning step in the set of non-intervention provisioning data, wherein the dominant error for the provision during the provisioning step in the set of non-intervention provisioning data is as an error that resulted in the DuF value, computed as a maximum of error durations for the provision;
   determine based on the dominant error whether waiting a certain time period may enable the provisioning of the machine in the cloud environment to self-resolve without requiring the intervention when the provisioning step becomes stuck during the provisioning of the machine in the cloud environment; and progress with the provisioning of the machine in the cloud environment after the provisioning has self-resolved when the dominant error indicates that waiting the certain time period may enable the provisioning to self-resolve without requiring the intervention.

16. The computer program product of claim 15, the program instructions executable by the processor of the system to further cause the system to execute the instructions to generate the set of intervention provisioning data and the set of non-intervention provisioning data from historic provisioning data.

17. The computer program product of claim 15, wherein the program instructions executable by the processor of the system to further cause the system to train a model based on the dominant error determined for each provision at each provisioning step of the provision.

18. The computer program product of claim 17, wherein the program instructions executable by the processor of the system to further cause the system to:

receive a set of event logs associated with a provisioning step of a test provision; and determine from the set of event logs a predicted dominant error for the provisioning step of the test provision.

19. The computer program product of claim 18, the program instructions executable by the processor of the system to further cause the system to determine from the set of event logs a step duration of the provisioning step, all errors that occur as part of the provisioning step, and an error duration for each of the errors.

20. The computer program product of claim 18, the program instructions executable by the processor of the system to further cause the system to determine a response category for the test provision and the predicted dominant error.

\* \* \* \* \*